Figure 1:
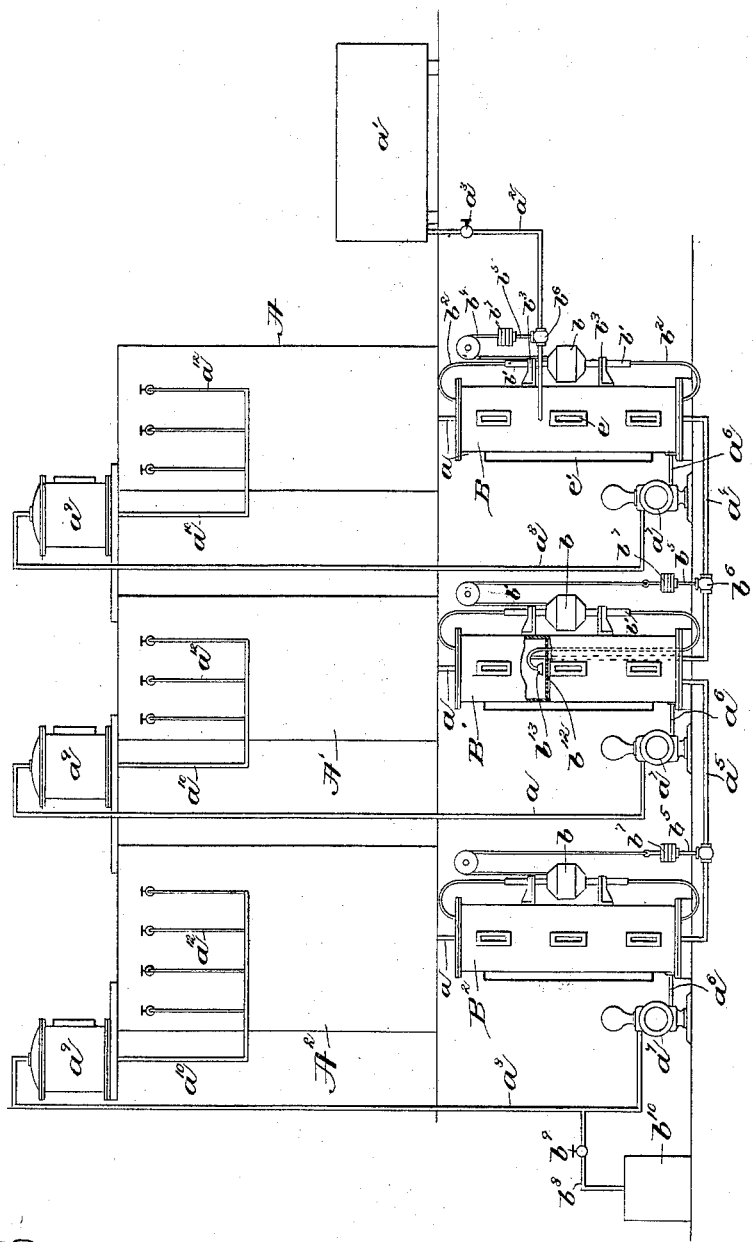

(No Model.) 5 Sheets—Sheet 1.

T. GAUNT.
EVAPORATING APPARATUS.

No. 435,090. Patented Aug. 26, 1890.

Witnesses.
Fred. S. Greenleaf
Howard F. Eaton

Inventor:
Thomas Gaunt,
by Crosby & Gregory
Atty's.

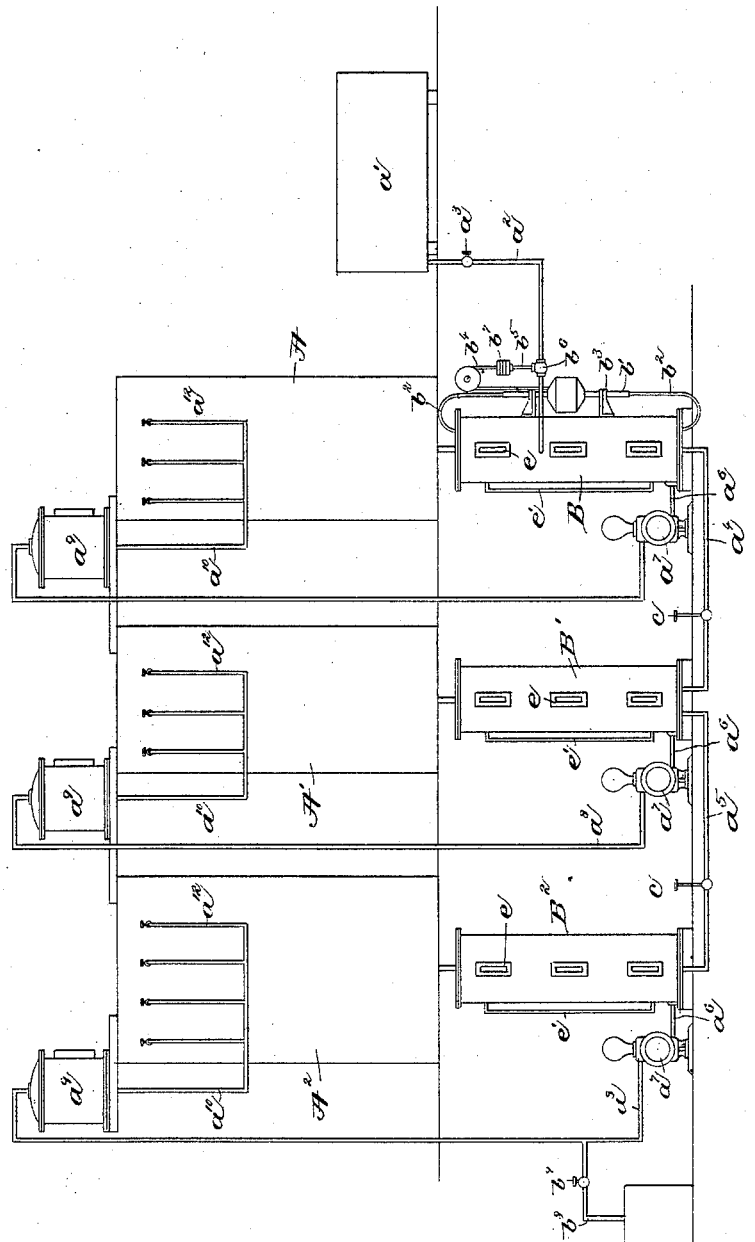

(No Model.) 5 Sheets—Sheet 3.
T. GAUNT.
EVAPORATING APPARATUS.
No. 435,090. Patented Aug. 26, 1890.
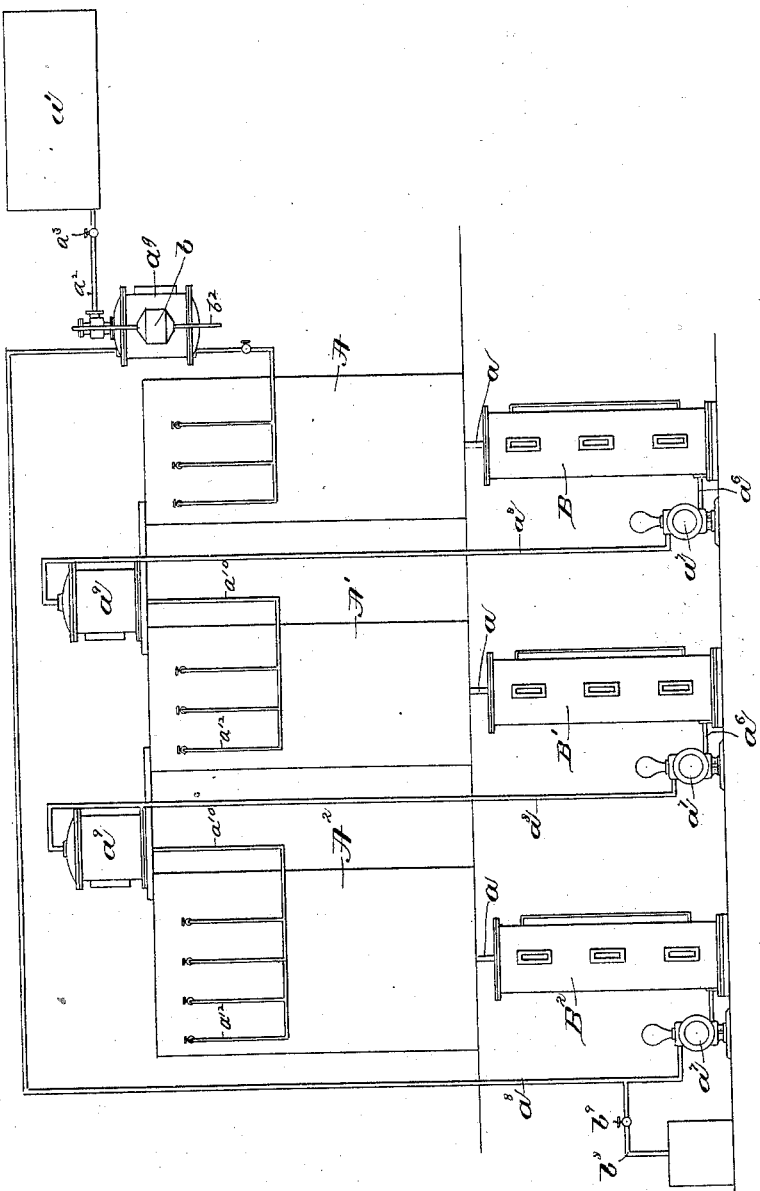
Witnesses.
Fred. S. Greenleaf
Howard F. Eaton.
Inventor:
Thomas Gaunt.
by Crosby & Gregory Atty's.

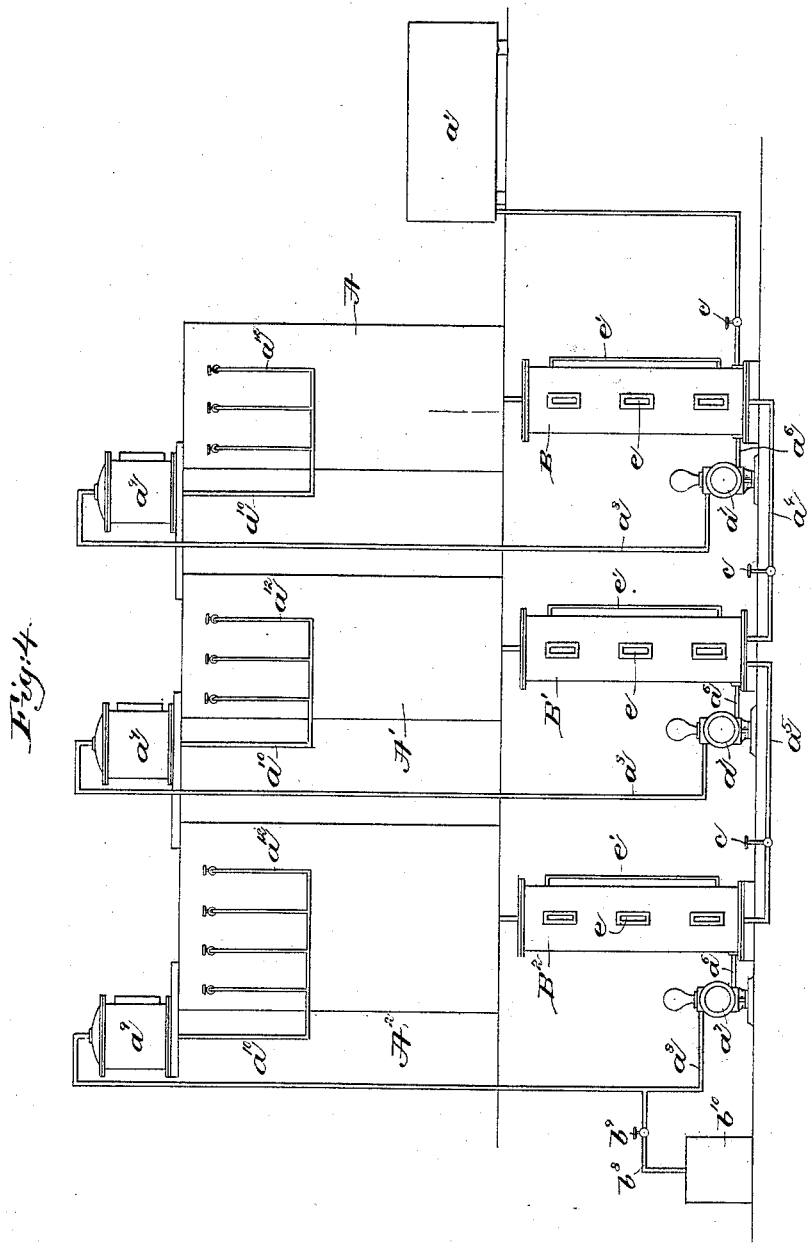

(No Model.) 5 Sheets—Sheet 5.
T. GAUNT.
EVAPORATING APPARATUS.
No. 435,090. Patented Aug. 26, 1890.
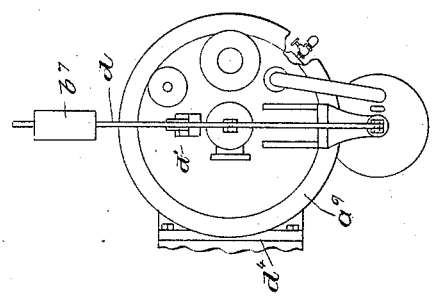
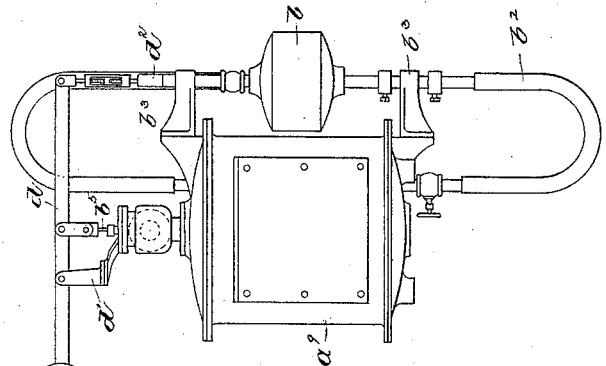
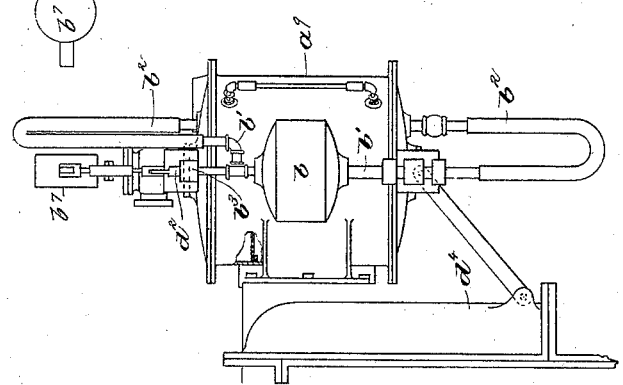

UNITED STATES PATENT OFFICE.

THOMAS GAUNT, OF BROOKLYN, NEW YORK.

EVAPORATING APPARATUS.

SPECIFICATION forming part of Letters Patent No. 435,090, dated August 26, 1890.

Application filed January 19, 1889. Serial No. 296,907. (No model.)

*To all whom it may concern:*

Be it known that I, THOMAS GAUNT, of Brooklyn, county of Kings, State of New York, have invented an Improvement in Evaporating Apparatus, of which the following description, in connection with the accompanying drawings, is a specification, like letters on the drawings representing like parts.

This invention relates to apparatus for the evaporation and distillation of liquids, and is an improvement upon the evaporating apparatus substantially such as shown and described in my application, Serial No. 258,655, filed December 22, 1887.

With the apparatus shown and described in the application referred to the liquor fed to the evaporators from the supply-tank is of low specific gravity, and the specific gravity of the liquid is raised by its passage through the evaporator; but for many purposes the specific gravity of the liquor passing from the evaporator may not be high enough—that is, the said liquor may not be sufficiently concentrated.

This invention has for one of its objects to provide the evaporating apparatus with means, as will be described, by which the liquor may be concentrated to any desired or required specific gravity or density for any particular purpose.

Another feature of my present invention consists in a novel arrangement of the apparatus, whereby economy in space is effected, as will be described.

The particular features in which my invention consists will be pointed out in the claims at the end of this specification.

Figure 1 is a diagram in elevation showing a series of three evaporators arranged on a level and each provided with an auxiliary chamber located below the said evaporator, and a regulator for each auxiliary chamber. Fig. 2 shows a series of three evaporators, each provided with an auxiliary chamber, and a single regulator to control the supply of liquid for the series. Fig. 3 shows a modified arrangement of evaporators and auxiliary chambers, a single regulator being connected to the first evaporator; Fig. 4, a modified arrangement of evaporators and auxiliary chambers; Fig. 5, a detail in elevation, on an enlarged scale, of the auxiliary chamber and its attachments for controlling the supply to the said chamber; Fig. 6, a side elevation of the auxiliary chamber and its attachments shown in Fig. 5, and Fig. 7 a top or plan view of the apparatus shown in Fig. 6.

Referring to Fig. 1, I have shown three evaporators A A' A², arranged substantially on a level, the said evaporators being preferably substantially such as shown and described in the application above referred to.

The evaporators A A' A², when arranged as shown in Fig. 1, may be supposed to be located on one floor of a building, and below the said evaporators are located auxiliary chambers or reservoirs B B' B², connected, respectively, to the said evaporators, the said auxiliary chambers being supposed to be located on a floor of the building below the floor upon which the evaporators are located. Each auxiliary chamber is connected to its respective evaporator by a pipe $a$. The auxiliary chamber B is connected, as shown in Figs. 1 and 2, to the liquid-supply tank $a'$ by a pipe $a^2$, provided, as shown, with a cock or valve $a^3$. The auxiliary chamber B is connected at its bottom, as herein shown, to the bottom of the auxiliary chamber B' by a pipe $a^4$, and the auxiliary chamber B' is connected by pipe $a^5$ to the auxiliary chamber B². Each auxiliary chamber at its lower end is connected by pipe $a^6$ to a pump $a^7$, and the said pump is connected by pipe $a^8$ to a vessel $a^9$, supported above the evaporator, and the said vessel is joined by pipe $a^{10}$ and branch pipes $a^{12}$ to the liquid-feeder of the evaporator, which feeder may be substantially such as shown in the application referred to.

The supply-pipe for each auxiliary chamber is provided, as shown in Fig. 1, with an inlet-valve, (not shown,) but which may be of any well-known construction, and the said inlet-valve is automatically operated by a regulator consisting, as shown, of a hollow vessel $b$, provided with rigid pipes $b'$, extended from the top and bottom of the said vessel and connected by flexible pipes $b^2$ to the top and bottom of the auxiliary chamber, the rigid pipes being extended through suitable guides $b^3$, secured, as shown, to the auxiliary chamber. The regulator $b$ is joined, as shown, by a connection—such as a rope or chain $b^4$—to the stem $b^5$ of the inlet-valve located in the valve-casing $b^6$, the said valve-stem having mounted upon or connected to it a counterbalancing-weight $b^7$, for a purpose as will be described. The outlet-pipe of the pump $a^7$, connected to the last evaporator $B^2$ of the series, is provided with a branch pipe $b^8$, having a cock or valve $b^9$, the said branch pipe being shown as discharging into a reservoir or vessel $b^{10}$, which may be located at any desired distance with relation to the apparatus.

The operation of the apparatus shown in Fig. 1 is substantially as follows: The cock or valve $a^3$ in the pipe $a^2$ is opened to permit the liquid of low specific gravity to flow from the supply-tank into the auxiliary chamber B, the automatic valve in the said pipe being at such time open, owing to the counterbalancing-weight $b^7$ overcoming the weight of the regulator $b$. The liquor flows from the auxiliary chamber B into the chamber B' and from the chamber B' into the chamber $B^2$. Each auxiliary chamber shown in Figs. 1 and 2 contains within it a diffuser or mixer, preferably a perforated metal plate $b^{12}$, (see Fig. 1,) and the inlet-pipe of each chamber discharges above the said plate, preferably through a rose $b^{13}$ or other suitable distributer. The liquor in each auxiliary chamber rises therein until it has obtained such level in the said chamber and regulator as to overcome the counterbalancing-weight $b^7$ and raise the valve, thus closing the same and cutting off the supply of liquor to the auxiliary chambers. The pumps are now started and each pump draws the liquor from its chamber and forces it up to the evaporator, through which it descends again into the auxiliary chamber in a more concentrated condition. As the liquor-level in the auxiliary chamber is diminished by the pump, the counterbalancing-weight overcomes the regulator and opens the valve, thus permitting a fresh supply from the tank to flow into the chamber B through the pipe $a^2$. The said fresh supply of liquor, being of lower specific gravity than the partially-concentrated liquor flowing from the evaporator into the chamber B, will be thoroughly diffused or spread over the plate $b^{12}$ and will be thoroughly mixed with the partially-concentrated liquor, so that the liquor in the chamber B below the plate $b^{12}$ will be of the specific gravity resulting from mixing fresh liquor with the concentrated liquor. The valve in the pipe $a^4$ is opened in the same manner, and the liquor from the chamber B, which is of greater specific gravity than the supply-liquor, flows into the chamber B', where it is further concentrated by its passage through the evaporator A', and the liquor from the chamber B' passes into the chamber $B^2$, from which it is pumped to the evaporator $A^2$, where it is still further concentrated. It will thus be seen that the liquor in each auxiliary chamber is concentrated by its passage through the evaporator connected to the said chamber, and that the liquor in the different chambers is of different specific gravity after the apparatus has been set in operation—that is, the liquor in the chamber B' is of greater specific gravity than the liquor in the chamber B, and the liquor in the chamber $B^2$ is of greater specific gravity than the liquor in the chamber B'. The liquor from the supply-tank flows into the different auxiliary chambers by pressure due to the head in the supply-tank, thus obtaining the same or a constant level of liquor in the said chambers; but after the apparatus has been set in operation the difference of vacuum in the different auxiliary chambers, due to the vacuum produced in the evaporator, which is different in each evaporator, causes the liquor from one auxiliary chamber to flow into the next succeeding auxiliary chamber under a head due to the difference of vacuum between the different chambers, which in a triple effect has been found in practice to be approximately six inches in the first chamber, as B, eighteen inches in the second, as B', and twenty-seven in the third, as $B^2$. The cock or valve $b^9$ in the discharge-pipe $b^8$ will in practice be opened more or less to discharge a greater or less quantity of the liquor concentrated in the chamber $B^2$, and it will be readily seen that a discharge of liquor from the said pipe lowers the level in the chamber $B^2$, which, through its regulator $b$, opens the inlet-valve to the said chamber, permitting liquor from the chamber B' to flow into the chamber $B^2$, the lowering of the liquor-level in the chamber B' opening in like manner the inlet-valve of the said chamber and permitting liquor to enter from the chamber B, and the lowering of the liquor in the chamber B opens the supply-valve. It will thus be seen that by regulating the cock or valve $b^9$ in the branch pipe to control the amount of liquor discharged the said liquor may be discharged from the said pipe at any degree of concentration.

As shown in Fig. 1, each auxiliary chamber is provided with a regulator to control the inlet for the said chamber; but, if desired, only the first auxiliary chamber may be provided with a regulator, the inlet-pipe of the remaining chambers being provided with a cock or valve $c$, which is regulated by hand, as shown in Fig. 2.

Referring to Fig. 3, each evaporator has connected to it an auxiliary chamber located below it, and the supply-pipe of the evaporator A is connected to a vessel $a^9$, having its inlet connected to the supply-tank $a'$ by the inlet-pipe $a^2$, provided with the hand cock or valve $a^3$. The outlet-pipe $a^8$ of the pump connected to the auxiliary chamber B discharges into a second vessel $a^9$, having its outlet pipe $a^{10}$ connected to the branch supply-pipes of the evaporator A', and the outlet-pipe $a^8$ of the pump joined to the auxiliary chamber B' discharges into a third vessel $a^9$, having its outlet-pipe $a^{10}$ connected to the branch supply-pipes of the evaporator $A^2$, and the outlet-pipe $a^8$ of the pump connected to the auxiliary chamber $B^2$ discharges into the vessel $a^9$, connected to the evaporator A, this latter outlet-pipe having the branch pipe $b^8$, provided with the regulating cock or valve $b^9$. The supply of liquor from the tank $a'$ to first vessel $a^9$ is controlled by the regulator $b$, connected by the pipes $b'$ $b^2$ to the top and bottom of the said chamber. The inlet-valve of the vessel $a^9$ referred to may be connected to the regulator by a cord or chain, substantially as shown in Fig. 1; or it may be connected as shown in Figs. 5, 6, and 7, wherein the valve-stem $b^5$ is secured to a lever $d$, pivoted to a bracket $d'$ on the said vessel, the said lever being connected by rod $d^2$, extended through guides $b^3$, the said lever having mounted on it the counterbalancing-weight $b^7$. The vessel $a^9$, connected to the evaporator A, is supported by a suitable casting or bracket $d^4$.

The operation of the apparatus, shown in Fig. 3, is as follows, viz: The hand cock or valve $a^3$ is opened to admit liquid from the tank into the vessel $a^9$, the inlet-valve of the said vessel being opened. The liquor admitted into the vessel $a^9$ flows through the evaporator A into the auxiliary chamber B, from whence it is pumped to the second vessel $a^9$, from which it discharges into the evaporator A', thence into the chamber B', and from the chamber B' to the evaporator $A^2$, through the third vessel $a^9$, connected therewith, thence into the chamber $B^2$, from whence the whole or a portion thereof may be returned to the first vessel $a^9$, a portion of the concentrated liquor being discharged through the branch pipe $b^8$.

The supply from the liquor-tank is controlled by the regulator $b$ in a similar manner to that described in connection with Fig. 1, the inlet-valve of the vessel $a^9$ being closed when the weight of the regulator overcomes the weight of the counter-balance.

Instead of automatically regulating the liquor-supply from the tank and from one auxiliary chamber to another, the said supply may be regulated by hand cocks or valves $c$, as shown in Fig. 4, the arrangement of apparatus shown in said figure being especially advantageous to economize in room and to enable a triple-effect apparatus to be placed in a comparatively small space.

The auxiliary chambers B B' $B^2$ are shown as provided with usual sight-glasses $e$ and liquor-gages $e'$.

I claim—

1. In an evaporating apparatus, the combination, with one or more evaporators, of an independent auxiliary chamber or reservoir located below and connected to said evaporator to receive liquor therefrom, a liquor-supply connected to said auxiliary chamber, a regulator to control the supply of liquor to the said chamber, and a pump connected to the auxiliary chamber to return partially-concentrated liquor from the auxiliary chamber or reservoir to the evaporator, substantially as described.

2. The combination, with an independent evaporator, of an auxiliary chamber or reservoir located below and connected to said evaporator to receive liquor therefrom, a liquor-supply connected to said auxiliary-chamber, a valve to control the supply of liquid to said auxiliary chamber, a regulator to control said valve, a pump connected to said auxiliary chamber and provided with an outlet-pipe connected to said evaporator, and a branch or discharge pipe connected to said outlet-pipe, and a valve in said branch pipe, whereby the liquid may be concentrated to any desired specific gravity, substantially as described.

3. In an evaporating apparatus, the combination, with an evaporator located on one level, of an independent auxiliary chamber or reservoir located on a lower level and connected to said evaporator to receive liquor therefrom, a liquid-supply for said evaporator, a regulator to control said supply, a vessel $a^9$, connected to the evaporator, and a pump connected to the said auxiliary chamber and vessel or reservoir, substantially as described.

4. In an evaporating apparatus, the combination, with an evaporator located on one level, of an independent auxiliary chamber or reservoir located on a lower level and connected to said evaporator to receive liquor therefrom, a liquid-supply connected to said auxiliary chamber or reservoir, a regulator to control the supply to the said chamber or reservoir, and a pump to elevate the liquor from the auxiliary chamber or reservoir to the evaporator, substantially as described.

5. In an evaporating apparatus, the combination, with a series of evaporators located on one level, of auxiliary chambers located on a lower level and connected to said evaporators to receive liquor therefrom, a pipe to connect said auxiliary chambers at their lower ends, a liquid-supply connected to the said auxiliary chambers, a valve to control the supply of the liquid to the auxiliary chambers, and a pump to elevate the liquor from the auxiliary chambers to the evaporators, substantially as described.

6. In an evaporating apparatus, the combination, with an evaporator located on one level, of an auxiliary chamber located on a lower level and connected to said evaporator to receive liquor therefrom, a diffuser or mixer in said auxiliary chamber, a liquid-supply connected to the said auxiliary chamber above the mixer, a regulator to control said supply, and a pump to elevate the liquor from the auxiliary chamber to the evaporator, substantially as described.

7. In an evaporating apparatus, the combination, with a series of evaporators, of independent auxiliary chambers connected to said evaporators to receive liquor therefrom, a liquid-supply for said evaporators, a regulator to control said supply, vessels $a^9$, connected to said evaporators, and pumps connected to the auxiliary chambers and to the said vessels, substantially as described.

8. In an evaporating apparatus, the combination, with a series of evaporators, of independent auxiliary chambers connected to said evaporators to receive liquor therefrom, a liquid-supply for said evaporators, a regulator to control said supply, vessels $a^9$, connected to said evaporators, and pumps connected to the auxiliary chambers and to the said vessels, and a discharge-pipe for the series of evaporators provided with a cock or valve to control the amount of liquor discharged, and thereby its concentration, substantially as described.

9. In an evaporating apparatus, the combination, with an evaporator located on one level, of an independent auxiliary chamber or reservoir located on a lower level and connected to the said evaporator to receive liquor therefrom, and provided with one or more sight-glasses $e$, by means of which the condition of the liquor being evaporated may be judged, a liquid-supply for said evaporator, a valve to control the supply for said evaporator, a vessel $a^9$, communicating with the said evaporator, and a pump connected to the auxiliary chamber and to the vessel $a^9$ to elevate the liquid from the auxiliary chamber to the said vessel, substantially as described.

In testimony whereof I have signed my name to this specification in the presence of two subscribing witnesses.

THOMAS GAUNT.

Witnesses:
JAS. H. CHURCHILL,
BLANCHE DEWAR.